(12) United States Patent
Fukuzato

(10) Patent No.: US 6,370,363 B1
(45) Date of Patent: Apr. 9, 2002

(54) CHARACTER INPUTTING METHOD FOR A HANDY PHONE USING A SEESAW KEY AND A DEVICE THEREOF

(75) Inventor: Atsushi Fukuzato, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/363,713

(22) Filed: Jul. 29, 1999

(30) Foreign Application Priority Data

Jul. 31, 1998 (JP) .......................................... 10-217317

(51) Int. Cl.[7] ................................................ H04B 1/38
(52) U.S. Cl. .................... 455/90; 455/26.1; 379/428.01; 379/433.08
(58) Field of Search ................................ 455/566, 925, 455/956, 957, 90, 550, 403, 26.1; 379/428, 433, 434, 354, 433.01, 433.06, 433.05; 345/123, 115

(56) References Cited

U.S. PATENT DOCUMENTS

| | | | | |
|---|---|---|---|---|
| 5,436,954 A | * | 7/1995 | Nishiyama et al. | 455/566 |
| 5,455,857 A | * | 10/1995 | McGuire | 379/355 |
| 5,485,174 A | * | 1/1996 | Henshaw et al. | 345/123 |
| 5,677,949 A | | 10/1997 | Macor | 379/354 |
| 5,812,117 A | * | 9/1998 | Moon | 345/169 |
| 5,872,521 A | * | 2/1999 | Lopatukin et al. | 340/825.44 |
| 6,052,070 A | * | 4/2000 | Kivela et al. | 341/22 |

FOREIGN PATENT DOCUMENTS

| | | |
|---|---|---|
| JP | 1-211019 | 8/1989 |
| JP | 1-211020 | 8/1989 |
| JP | 2-71616 | 3/1990 |
| JP | 2-86257 | 3/1990 |
| JP | 9-34620 | 2/1997 |
| JP | 9-212281 | 8/1997 |
| JP | 10-134677 | 5/1998 |
| JP | 10-143301 | 5/1998 |
| JP | 10-187337 | 7/1998 |
| WO | WO 9735413 | 9/1997 |

OTHER PUBLICATIONS

European Search Report (in English) issued Jan. 20, 2000 in a related application.
Japanese Office Action issued Aug. 15, 2000 in a related application with English–language translation of relevant portions.

* cited by examiner

Primary Examiner—William Trost
Assistant Examiner—Conguan Tran
(74) Attorney, Agent, or Firm—Ostrolenk, Faber, Gerb & Soffen, LLP

(57) ABSTRACT

A character inputting method for a handy phone or similar terminal unit uses a first and a second button capable of being pressed or shifted independently of each other. The user of the terminal unit operates the first button and/or second button to scroll characters appearing on a display either in the forward direction or in the backward direction, selects desired one of the characters, and fixes it. When the user presses the two buttons at the same, the existing one of the vertical and horizontal scroll directions is replaced with the other direction. The user selects the desired character by the forward or backward scroll and then shifts the first or the second button to fix the character. A device for practicing the character inputting method is also disclosed.

16 Claims, 8 Drawing Sheets

CHARACTER INPUTTING METHOD FOR A HANDY PHONE USING A SEESAW KEY AND A DEVICE THEREOF

BACKGROUND OF THE INVENTION

The present invention relates to a handy phone or similar terminal unit and more particularly to a character inputting method for a terminal unit using a seesaw key and a device therefor.

It is a common practice for the user of a handy phone to input desired characters on numeral keys arranged on the phone. However, this kind of character inputting scheme will be problematic when the numeral keys are omitted in the future, e.g., when the handy phone is reduced in size to such a degree that it cannot accommodate the numeral keys or when the portion of the phone accommodating the numeral keys is used for another purpose. In light of this, there is an increasing demand for a handy phone with a small size, simple character inputting scheme.

Japanese Patent Laid-Open Publication No. 9-34620, for example, discloses inputting means replacing the conventional numeral keys or similar button type keys so as to reduce the size of a terminal unit. The inputting means includes particular operating portions each being movable back and forth in a particular direction. Inputting means detects the physical directions of movement of the above operating portions. In a character input mode, control means switches, based on the output of the inputting means, characters and symbols to appear on display means or fix an input. However, the problem with this conventional inputting means is that it renders the terminal unit sophisticated in construction and difficult to operate.

Technologies relating to the present invention are also disclosed in, e.g., Japanese Patent Laid-Open Publication Nos. 1-211019 and 1-211020.

SUMMARY OF THE INVENTION

It is therefore an object of the present invention to provide a handy phone or similar terminal unit which is small size and easy to operate.

It is another object of the present invention to provide a character inputting method for a handy phone or similar terminal unit and a device therefor.

In accordance with the present invention, a character inputting method for a terminal unit includes the steps of providing on the terminal unit a first and a second button capable of being pressed or shifted independently of each other by the user of the terminal unit, causing the user to press at least one of the first and second buttons for scrolling and searching characters appearing on a display in either one of the forward and backward directions, and causing the user to shift at least one of the first and second buttons for selecting a desired character and fixing the desired character.

Also, in accordance with the present invention, a terminal unit includes a display and a store section storing character sequences beforehand. An inputting device includes at least one of a first and a second button capable of being pressed or shifted independently of each other by the user of the terminal unit. A controller controls, when the user presses at least one of the first and second buttons, the scroll of characters appearing on the display in either one of the vertical and horizontal directions and in either one of the forward and backward direction. The controller sequentially scrolls, when the user operates at least one of the first and second buttons, the characters in the forward direction or the backward direction to thereby search the characters, and selects, when the user shifts at least one of the first and second buttons, a desired character and fixes the character to thereby input it. The desired character is written to the first store section.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
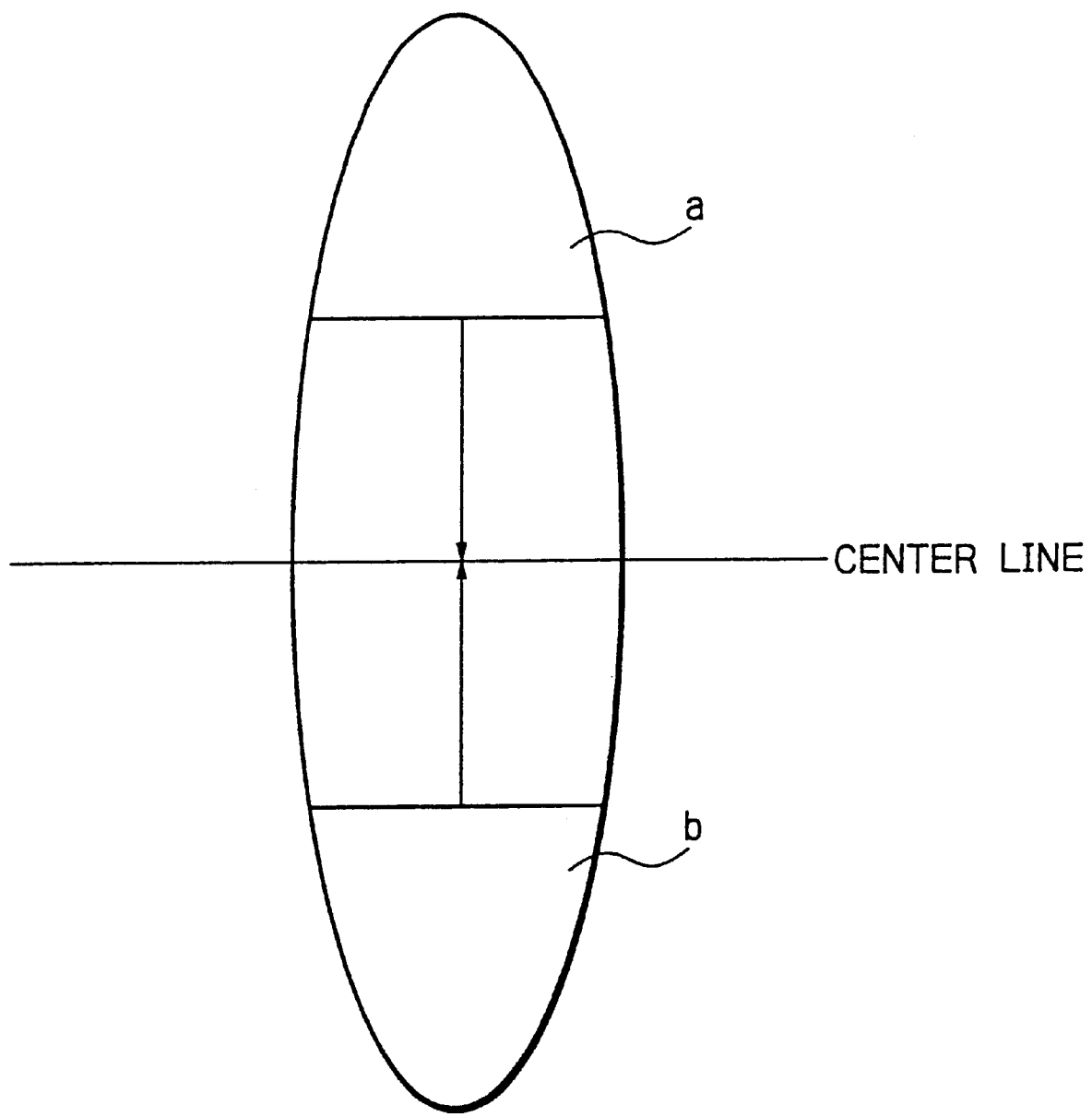
FIG. 1 is a plan view showing a seesaw key or inputting means included in a terminal unit embodying the present invention.

Referring to FIG. 1 of the drawings, a seesaw key included in a handy phone or similar terminal unit embodying the present invention is shown. As shown, the seesaw key includes two buttons a and b facing each other at opposite sides of a centerline. The buttons a and b are individually shiftable toward and away from each other, as indicated by arrows.

Figure 2:
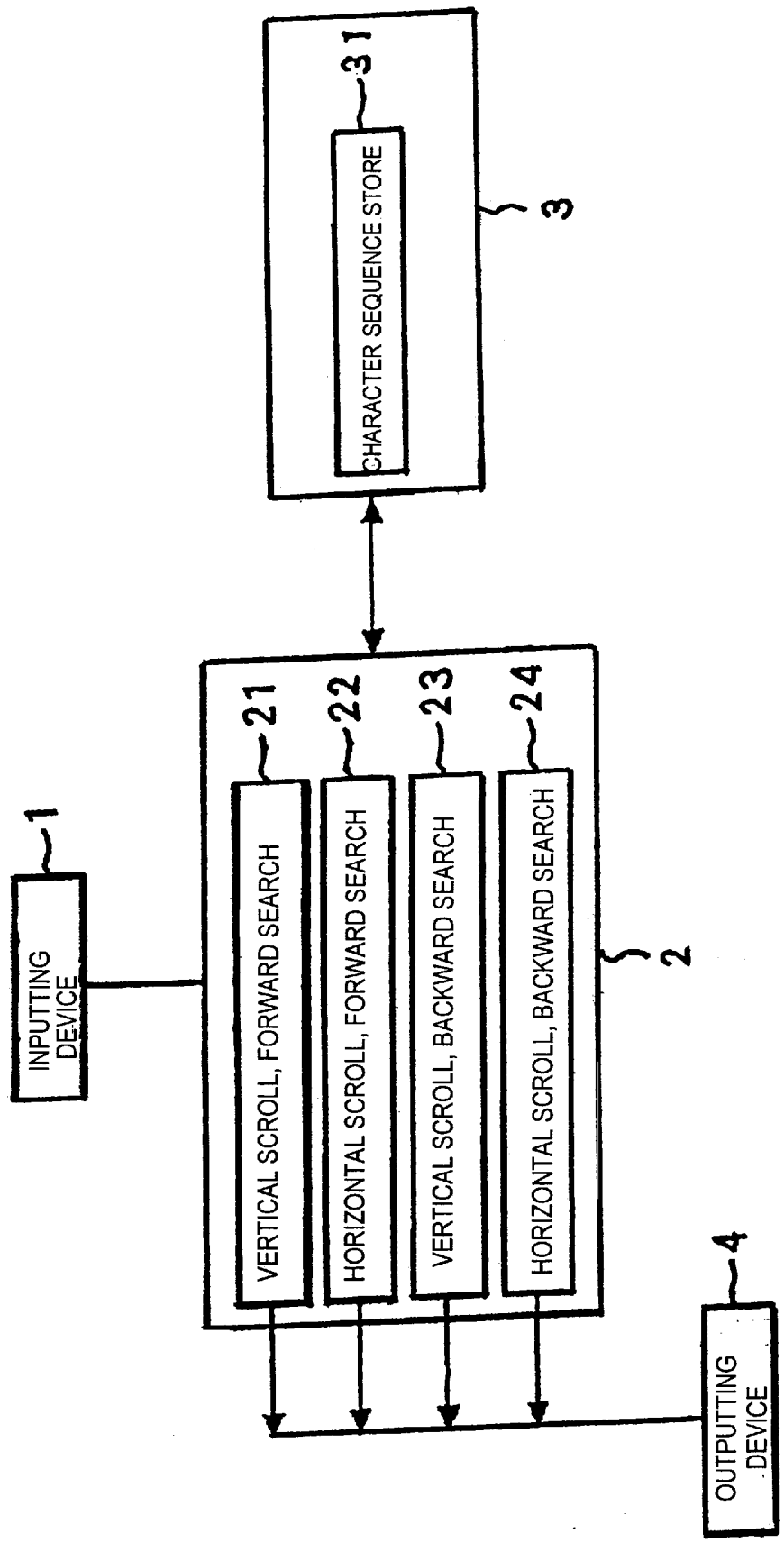
FIG. 2 is a block diagram schematically showing a specific arrangement of the illustrative embodiment.

FIG. 2 shows part of a specific arrangement of the handy phone relating to the illustrative embodiment. As shown, the handy phone includes an inputting device 1 implemented by the seesaw key. A data processing device 2 is operable under program control. A storing device 3 stores character sequences to be searched beforehand. An outputting device 4 is implemented by an LCD (Liquid Crystal Display) by way of example. When the inputting device 1 feeds a signal representative of a character to the data processing device 2, the data processing device 2 searches the storing device 3 for finding the character and feeds the character to the outputting device 4. The storing device 3 includes a character sequence store 31 for sequentially storing characters input on the inputting device 1.

The data processing device 2 includes a vertical scroll, forward search 21, a horizontal scroll, forward search 22, a vertical scroll, backward search 23, and a horizontal scroll, backward search 24.

The data processing device 2 sequentially searches the characters stored in the storing device 3 forward when the button a, FIG. 1, is pressed or sequentially searches them backward when the button b, FIG. 1 is pressed. When the buttons a and b are pressed at the same time, the scroll direction for character search is switched between the horizontal direction and the vertical direction. To fix a character or to collect a character, the button a or b is shifted to the centerline shown in FIG. 1.

Figure 3:
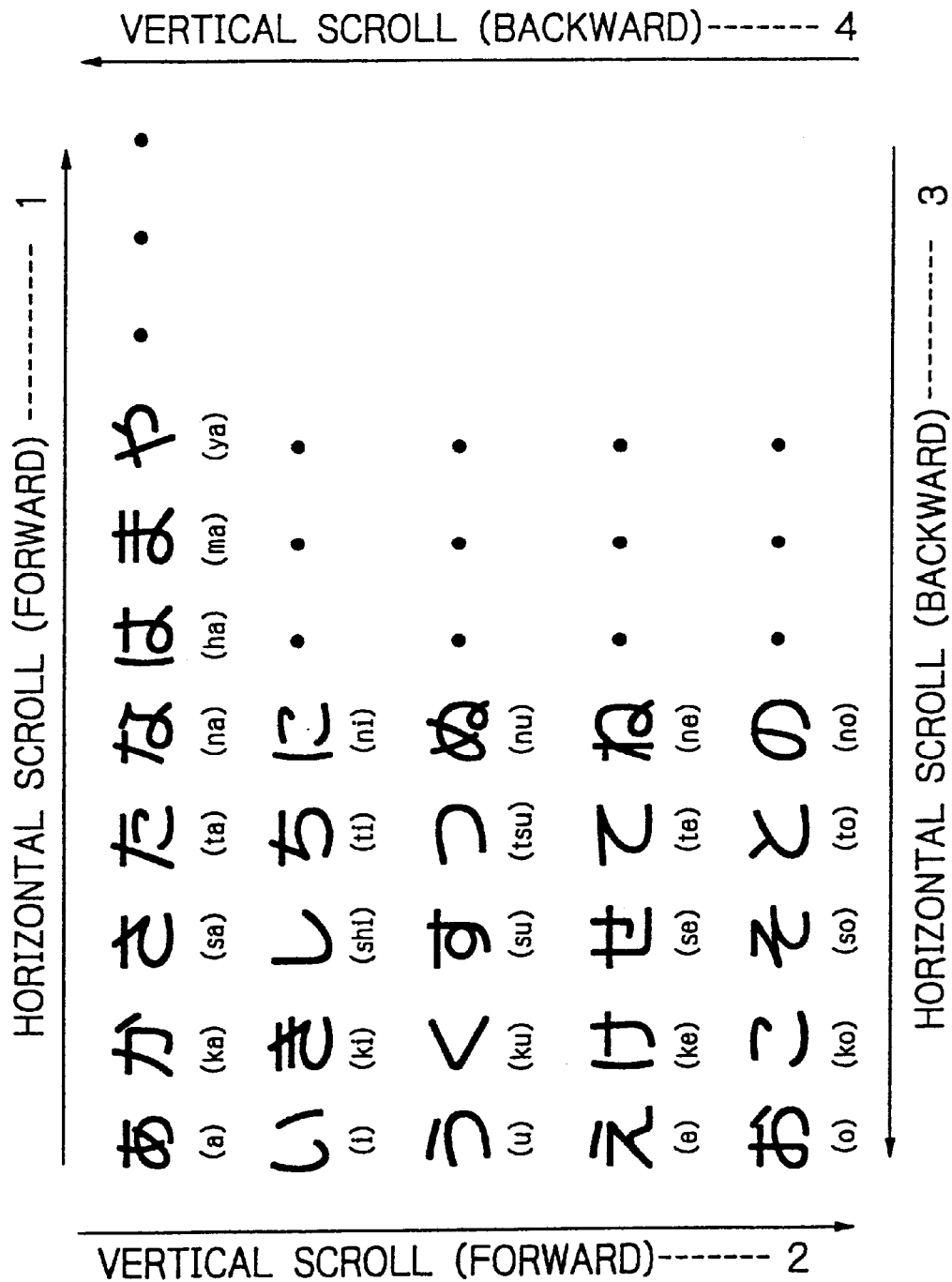
FIG. 3 shows specific character sequences which the illustrative embodiment search.

FIG. 3 shows Japanese syllabic character sequences stored in the character sequence store 31 by way of example. The vertical scroll, forward search 21 vertically searches the character sequences forward, i.e., in the order of "a, i, u, e, o, . . . ". The horizontal scroll, forward search 22 horizontally searches the character sequences forward, i.e., in the order of "a, ka, sa, ta, na, . . . ". The vertical scroll, backward search 23 vertically searches the characters in the direction opposite to the direction assigned to the search 21. Likewise, the horizontal scroll, backward search 24 searches the characters in the direction opposite to the direction assigned to the search 22.

In FIG. 3, the above horizontal forward search, vertical forward search, horizontal backward search and vertical backward search are respectively designed by the reference numerals 1, 2, 3 and 4, and each is indicated by a particular arrow. Desired one of the four different scroll directions is selected on the seesaw key shown in FIG. 1.

Figure 4:
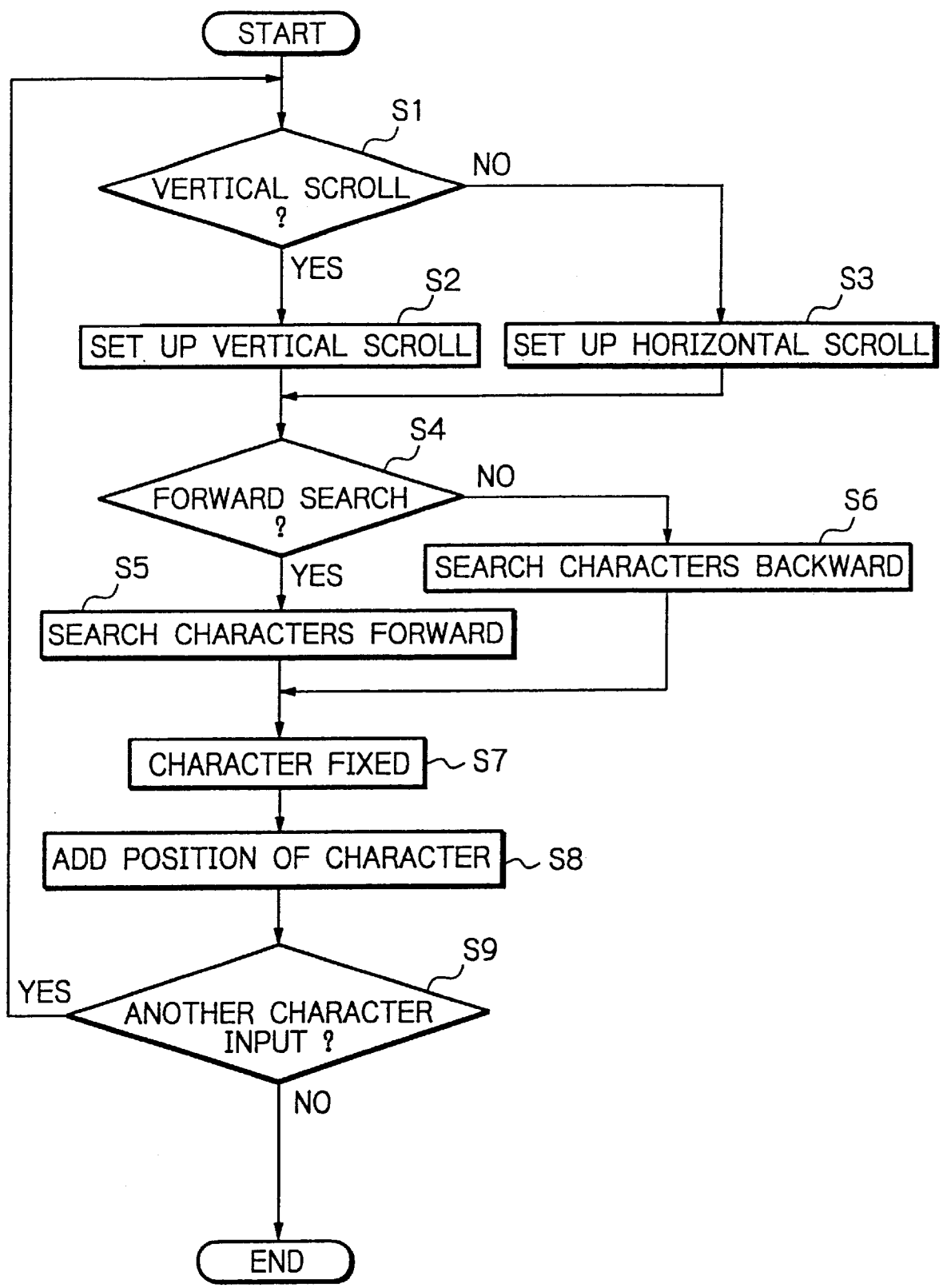
FIG. 4 is a flowchart demonstrating a specific character input procedure available with the illustrative embodiment.

A specific operation of the illustrative embodiment for inputting characters will be described with reference to FIG. 4. As shown, a desired scroll direction for searching characters, i.e., either the vertical direction or the horizontal direction is set up (steps S1, S2 and S3). If the characters should be searched in the forward direction (YES, step S4), they are searched in the forward direction (step S5). If the characters should be searched in the backward direction (NO, step S4), they are searched in the backward direction (step S6). After the step S5 or S6, a character is fixed (step S7), and then information representative of the position of the character is added to the character (step S8). When another desired character is input (YES, step S9), the steps S1–S8 are repeated.

Figure 5:
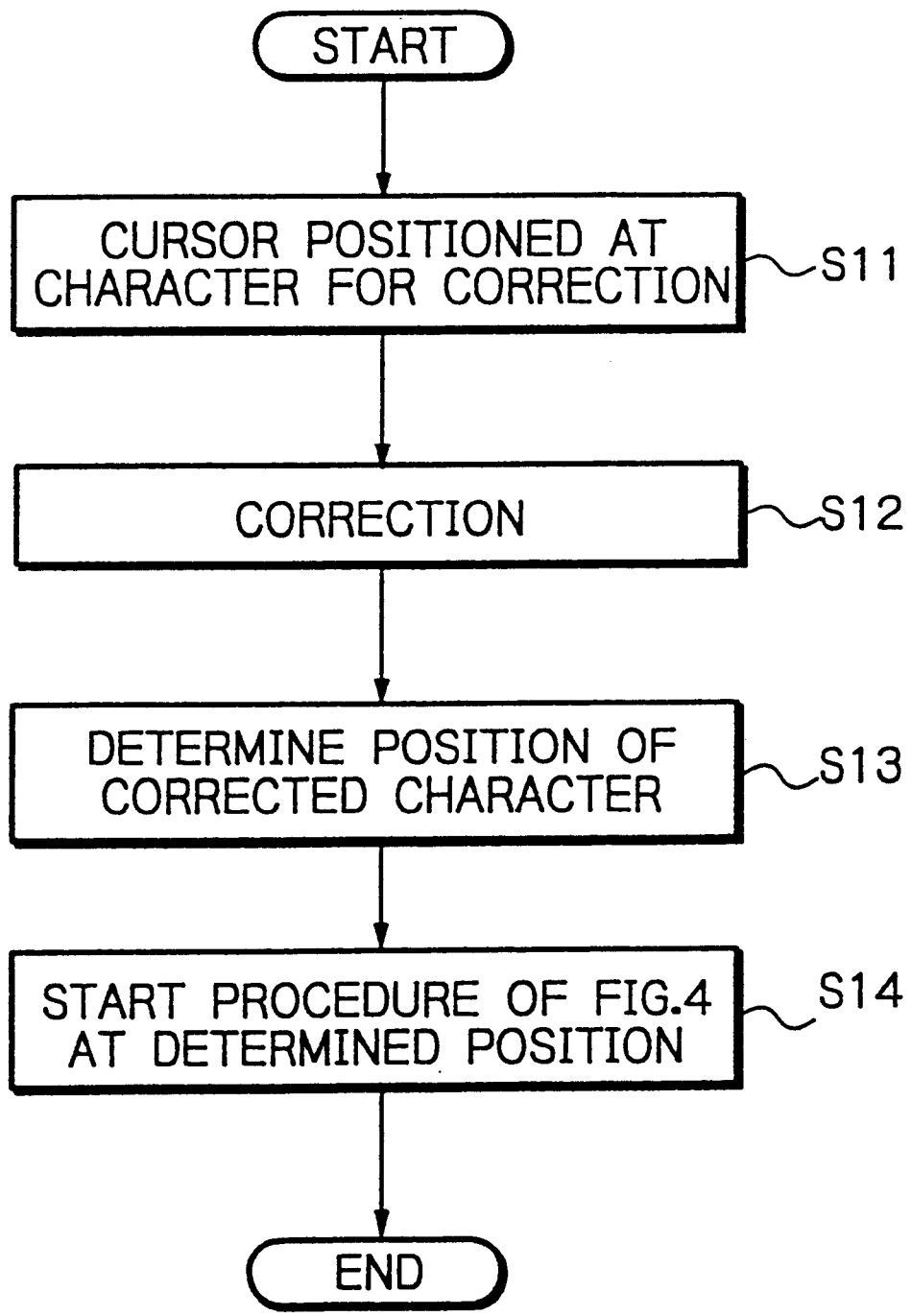
FIG. 5 is a flowchart demonstrating a specific character correction procedure also available with the illustrative embodiment.

FIG. 5 shows a procedure available with the illustrative embodiment for correcting a character. As shown, a cursor, not shown, is positioned at a character to be corrected (step S11), and then the character is fixed (step S12). Subsequently, the position of the character to be corrected is determined (step S13). Thereafter, the procedure described with reference to FIG. 4 is executed on the basis of the above position (step S14).

Figure 6:
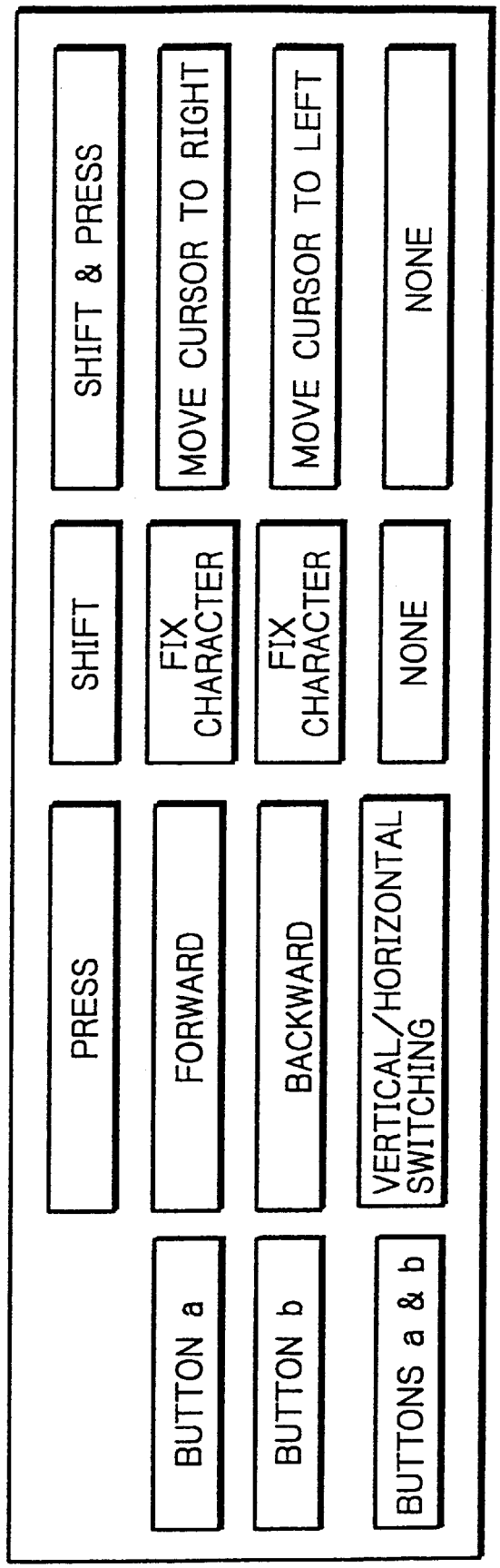
FIG. 6 is a table listing the manners of operation of the seesaw key of FIG. 1 and functions available therewith.

FIG. 6 tabulates functions available with the inputting device or seesaw key 1, FIG. 1. The button a may be pressed to scroll in the forward direction, or shifted to a fix a desired character, or shifted and then pressed to move the cursor in the right-and-left direction on the outputting device or LCD 4, FIG. 1. The button b may be pressed to scroll in the backward direction, or shifted to fix a desired character, or shifted and then pressed to move the cursor in the right-and-left direction on the outputting device 4. Further, the buttons a and b may be pressed at the same time to switch the scroll direction between vertical and horizontal.

More specifically, the inputting device or seesaw key 1 of the illustrative embodiment is operated as follows.

(1) To forward scroll, the button a is pressed;
(2) To backward scroll, the button b is pressed;
(3) To select the vertical scroll or the reverse scroll, the buttons a and b are pressed at the same time;
(4) To fix a desired character or to correct a desired character, the button a or b is shifted to the center;
(5) To move the cursor th the right, the button a is shifted to the center and then pressed; and
(6) To move the cursor to the left, the button b is shifted to the center and then pressed.

In operation, a signal representative of the input or the correction of a character is input via the inputting device 1. In the case of the input of a character, the procedure of FIG. 4 is executed for inputting the character. Specifically, when the button a is pressed, the character sequences stored in the character sequence store 31 of the storing device 3 are sequentially searched forward (step S5). When the button b is pressed, the above character sequences are sequentially searched backward (step S6). When the buttons a and b are pressed at the same time, the existing horizontal/vertical scroll direction is replaced with the other direction. Subsequently, desired one of the characters stored in the character sequence store 31 is selected and then fixed (step S7). At this instant, information representative of the position of the above character in the store 31 is added, as stated earlier (step S8).

As for the input of a character, the forward search sequentially advances in the order of the column beginning with "a", the column beginning with "ka", the column beginning with "sa" and so forth. The backward search sequentially advances in the reverse order, e.g., the column beginning with "sa" to the column beginning with "a"; when "o" is displayed, the backward search ends with "a" via "e", "u" and "i".

Assume that "i" is currently displayed during the input of characters. Then, the buttons a and b may be pressed at the same time for causing the row beginning with "i" to be displayed. In this manner, the vertical search direction or the horizontal search direction can be selected, as desired. Should the column beginning with "a" and successive columns be simply searched in this order, the input of characters would be slowed down.

On the other hand, assume that the first signal input via the inputting device 1 is indicative of character correction. Then, after the cursor has been position at a character to be corrected on the outputting device 4, the characters stored in the character sequence store 31 are searched to determine the position of the above character on the basis of a code added to the character. This allows the next character to be searched for on the basis of the position of the corrected character. For example, when "o" is corrected and if the scroll direction is forward, "ka", "ki", "ku" and so forth following "o" are sequentially searched for correction. If the scroll direction is backward, "o" is followed by "e", "u", "i" and "a". This can also be done by pressing the buttons a and b at the same time.

Figure 7:
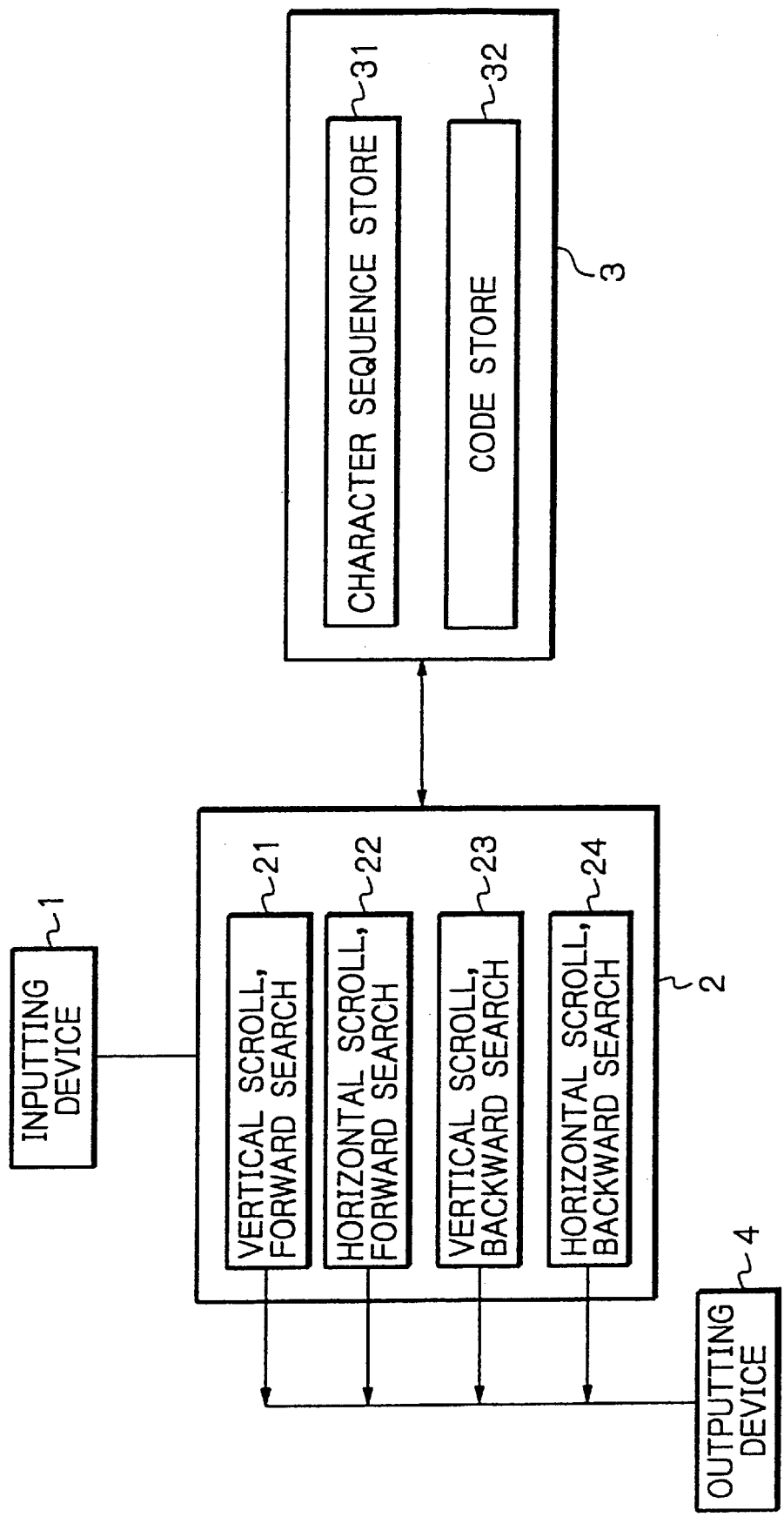
FIG. 7 is a schematic block diagram showing an alternative embodiment of the present invention.

An alternative embodiment of the present invention which is also applied to a handy phone by way of example will be described with reference to FIG. 7. As shown, this embodiment differs from the previous embodiment in that the storing device 3 includes a code store 32 in addition to the character sequence store 31. The code store 32 stores a code or information to be added when a character is determined. A combination of information to be added is compared with combinations previously stored in the storing device 3. If the former is identical with the latter halfway, then the entire character sequence is displayed.

For example, assume that a character sequence "ke, i, ta, i" exists in the storing device 3, and that a character sequence "ke, i" are input on the inputting device 1 in this order. Then, information added to "ke, i" is compared with the information stored in the storing device 3 halfway, if the former is identical with the latter, the entire character sequence is displayed. Specifically, because the character sequence "ke, i, ta, i" is stored in the storing device 3, it is displayed as soon as "ke, i" is input. This allows the user to easily input, e.g., identical names in the form of characters.

Figure 8:
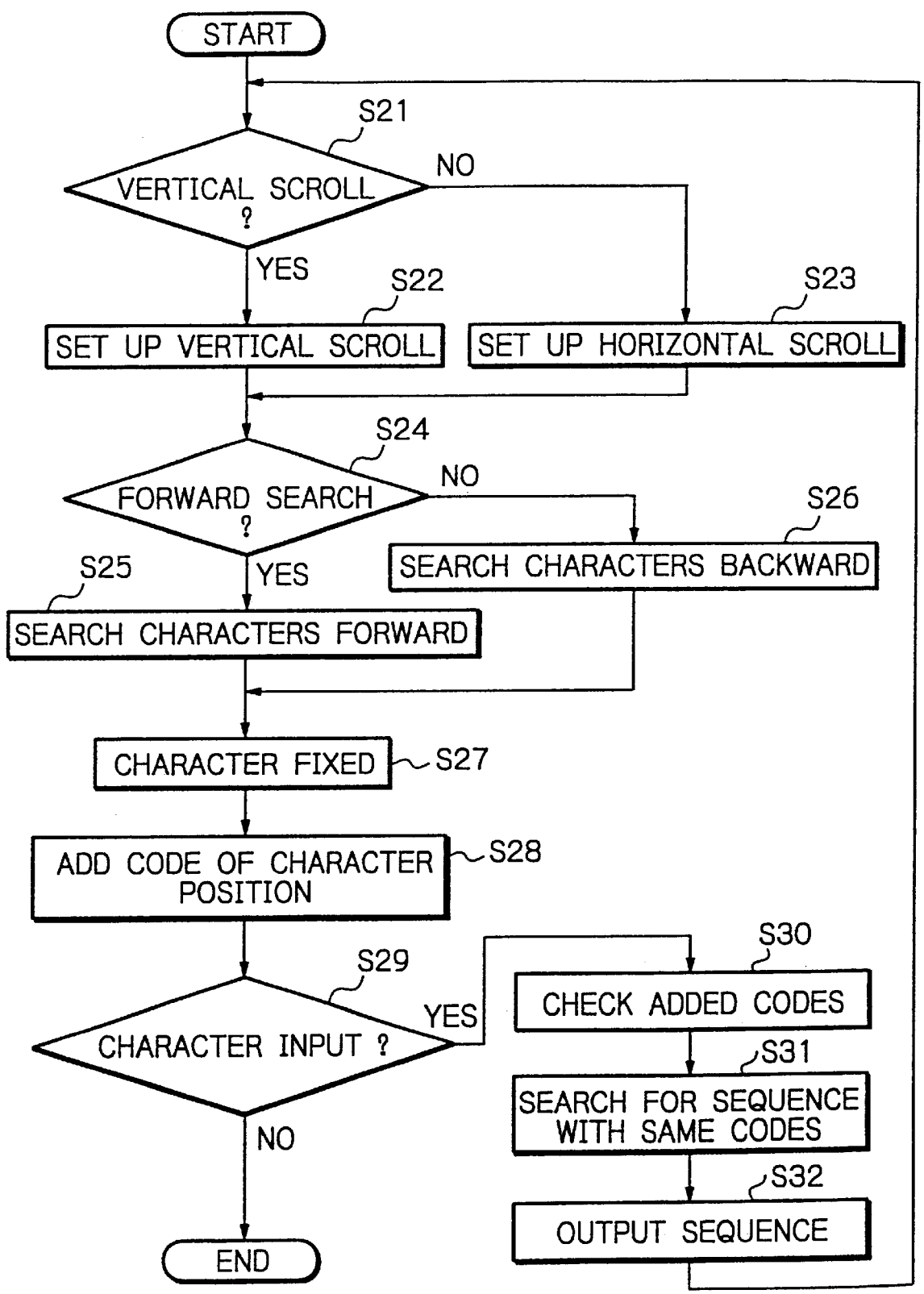
FIG. 8 is a flowchart showing a specific operation of the alternative embodiment.

FIG. 8 shows a specific operation of the above alternative embodiment. In FIG. 8, steps S21–S27 are identical with the steps S1–S7 of FIG. 4 and will not be described in order to avoid redundancy. As shown, after a character has been fixed (step S27), information added to the character is written to the code store 32 (step S28). Subsequently, when characters are input one after another (YES, step S29), the information sequence particular to the characters is searched for (step S30) in order to find a character sequence having the same information sequence (step S31). If a character sequence identical with the input character sequence halfway exists in the storing device 3, the entire character sequence is displayed (step S32).

As stated above, the illustrative embodiments each include inputting means implemented by a seesaw key. The seesaw key has a first and a second button which can be pressed and/or shifted independently of each other. With the first and second keys, the user may search for a desired character by the forward scroll or the backward scroll and then input the character. In addition, the user may select either the vertical scroll or the horizontal scroll by pressing the two buttons at the same time. The user may press either one of the two buttons to scroll characters on display means either forward or backward and then shift it to fix a desired character. Further, the user may shift and then press one of the buttons in order to move a cursor on the screen of the display means.

When a desired character is fixed, information representative of the position of the character in a first store section storing character sequences is written to a second store. To correct a character, the user operates the first button or the second button to position the cursor at the character appearing on the screen of the display means. In response, the position of the above character is determined by searching the character sequence of the first store section, so that the subsequent search proceeds on the basis of the position determined.

Moreover, information added to characters or a character sequence input halfway is compared with information registered at the second store section. If the former is identical with any one of the latter, the corresponding character sequence is read out of the first store section and displayed in a complete form.

In summary, the present invention allows characters to be input faster than the conventional numeral keys scheme and thereby enhances easy and efficient operation. This advantage is achievable with a seesaw key capable of switching forward/backward scroll and horizontal/vertical scroll alone. Further, the present invention is capable of starting a search at the position of a corrected character because it adds a code to a determined character.

Various modifications will become possible for those skilled in the art after receiving the teachings of the present disclosure without departing from the scope thereof.

What is claimed is:

1. A character inputting method for a terminal unit having a first and a second button each capable of being pressed and individually shifted toward and away from each other, the method comprising:

pressing at least one of said first and second buttons for scrolling and searching characters appearing on display means in either one of a forward direction and a backward direction;

shifting at least one of said first and second buttons for selecting a desired character and fixing said desired character; and switching a scroll direction between a vertical direction and a horizontal direction by pressing said first and second buttons at the same time.

2. A method as claimed in claim 1, further comprising:

scrolling, by pressing at least one of said first and second buttons, the characters appearing on said display means in the forward direction or the backward direction, and fixing, by shifting at least one of said first and second buttons, an input of a character selected.

3. A method as claimed in claim 1, further comprising:

moving, by shifting and then pressing at least one of said first and second buttons, a cursor appearing on a screen of said display means.

4. A method as claimed in claim 1, further comprising:

writing, when the character is fixed, information representative of a position of said character in a first store section to a second store section.

5. A method as claimed in claim 1, further comprising:

positioning, by shifting at least one of said first and second buttons, a cursor at a character to be corrected on a screen of said display means, then searching, based on information added to said character, character sequences stored in a first store section to thereby determine a position of said character, and then searching the characters at said position.

6. A method as claimed in claim 1, wherein the terminal unit comprises a handy phone.

7. A character inputting method for a terminal unit having a first and a second button each capable of being pressed and individually shifted toward and away from each other, the method comprising:

pressing at least one of said first and second buttons for scrolling and searching characters appearing on display means in either one of a forward direction and a backward direction;

shifting at least one of said first and second buttons for selecting a desired character and fixing said desired character;

positioning, by shifting at least one of said first and second buttons, a cursor at a character to be corrected on a screen of said display means, then searching, based on information added to said character, character sequences stored in a first store section to thereby determine a position of said character, and then searching the characters at said position, wherein when information of characters or a character sequence input halfway is identical with any one of combinations of information of characters or character sequences stored in a second store section, one of the character sequences stored in said first store section and corresponding to said character sequence input halfway is read out as a complete character sequence.

8. A terminal unit comprising:

display means;

a first store section storing character sequences;

inputting means including at least one of a first and a second button capable of being pressed or shifted independently of each other; and control means for controlling, when pressing at least one of said first and second buttons, a scroll of characters appearing on said display means in either one of a vertical and a horizontal direction and in either one of a forward direction and a backward direction, wherein said control means:

scrolls, when at least one of said first and second buttons is pressed, the characters in the forward direction or the backward direction to thereby search said characters;

selects, when at least one of said first and second buttons is shifted, a desired character and fixes said desired character to thereby input said desired character, said desired character being written to said first store section; and switches a scroll direction between the vertical direction and the horizontal direction when said first and second buttons are pressed at the same time.

9. A terminal unit as claimed in claim 8, wherein said control means moves, when at least one of said first and second buttons is pressed, a cursor appearing on a screen of said display means.

10. A terminal unit as claimed in claim 8, further comprising a second storage for storing, when fixing the character, information representative of a position of said character in said first store section.

11. A terminal unit as claimed in claim 8, wherein when at least one of said first and second buttons is shifted for correcting a character, said control means positions a cursor at said character on a screen of said display means, then searches, based on information added to said character, character sequences stored in said first storage to thereby determine a position of said character, and then starts searching the characters at said position.

12. A terminal unit as claimed in claim 8, wherein said first and second buttons comprise a seesaw key.

13. A terminal unit as claimed in claim 8, wherein said terminal unit comprises a handy phone.

14. A terminal unit comprising:
   a display;
   a storage section;
   a first and a second button capable of being pressed or shifted independently of each other; and
   a controller that:
   (a) scrolls characters appearing on the display in either one of a vertical and a horizontal direction or in either one of a forward direction and a backward direction in response to the pressing of at least one of the first and second buttons;
   (b) switches a scroll direction between the vertical direction and the horizontal direction in response to the pressing of the first and second buttons at the same time; and
   (c) selects a desired character and stores the desired character in the storage section in response to the shifting of at least one of the first and second buttons.

15. A terminal unit as claimed in claim 14, wherein the controller moves a cursor appearing on the display in response to the shifting and pressing of at least one of the first and second buttons.

16. A terminal unit as claimed in claim 14, wherein the first and second buttons are capable of being shifted between a first and a second position, the storage section contains a character sequence and information representing a position of the selected character in the character sequence, and the controller further:

moves a cursor appearing on the display to a character to be corrected in response to the shifting from the first to the second position and pressing of at least one of the first and second buttons; and selects the character to be corrected in response to the shifting from the second position to the first position the button used to move the cursor; and starts the scrolling of the characters in the character sequence appearing on the display based on the information representing the position of the character to be corrected in the character sequence stored in the second storage section in response to the pressing of at least one of the first and second buttons.

* * * * *